Patented Jan. 17, 1950

2,494,910

UNITED STATES PATENT OFFICE 2,494,910

METHOD OF AND COMPOSITION FOR COATING ALUMINUM

Frank Palin Spruance, Jr., Ambler, Pa., assignor to American Chemical Paint Company, Ambler, Pa., a corporation of Delaware No Drawing. Application July 12, 1948, Serial No. 38,192

7 Claims. (Cl. 148—6.16)

This invention relates to the art of coating aluminum and alloys thereof in which aluminum is the principal ingredient, and is particularly concerned with the provision of a simple process and an improved material for producing a coating on aluminiferous metals, which coating is strongly protective against corrosion and is also capable of serving as an excellent base for paint or other similar finish.

The principal objects of the invention are to increase, under normal service conditions, the durability of aluminum, or aluminum alloy objects or surfaces; to improve the resistance of aluminiferous metals to humid or salt-laden atmospheres such as are encountered in the tropics or near or over the sea; to improve the degree of durability of the protection afforded by paints, lacquers, etc. on surfaces of aluminum or aluminum alloys; to provide a coating for aluminiferous metals which by itself is greatly protective and to attain the foregoing objectives by means which are more simple and more economical than any which have been employed hitherto.

The foregoing, together with such other objects and advantages as may appear hereinafter or are incident to my invention, are attained in accordance with the following disclosure which describes materials and conditions useful in carrying out my invention.

The invention is based upon the discovery that the treatment of aluminum or alloys thereof in which aluminum is the principal ingredient with aqueous solutions containing as their principal coating-producing ingredients phosphate ions, dichromate ions, and fluoride ions in a certain region as to the proportions of the ingredients, leads to the formation of an adherent coating which has outstanding merit in inhibiting corrosion and improving paint durability. Generally speaking, the form in which the ions are introduced seems to make little or no difference as long as these remain in the solution in the correct proportions and the solution has the proper pH. For instance, the phosphate ion may be introduced as phosphoric acid or as a salt of phosphoric acid, such as monosodium, monopotassium or mono-ammonium phosphate; the fluoride ion may be introduced as a solution of hydrofluoric acid, potassium fluoride, etc.; the dichromate ion may be introduced as chromic acid ($CrO_3$), as potassium or as sodium chromate or dichromate. The proper pH of the solution may be obtained by use of materials such as above described either in proportions which will give the correct pH when in solution, or by the addition of any conventional acid or alkali to adjust the pH of the resulting solution where the materials employed do not of themselves yield the required pH.

The kind and quantity of cations which may be present are not in themselves important except insofar as their salts act as buffers to regulate the pH of the solution, or as they may cause the loss of active ingredients (anions) by precipitation of salts whose solubility products may be exceeded. Among the cations which may be present in reasonable quantity without doing harm are those of aluminum, trivalent chromium, zinc, copper, manganese, iron, nickel, cobalt, calcium, barium, strontium, tin and others. Excessive amounts of aluminum, calcium, etc. may tend to cause a loss of fluoride ion by precipitation but seem to do no other noticeable harm. Fluoride ion so lost may be replaced and the solution thus restored to its optimum condition.

Foreign anions may also be present in moderate quantities without causing any difficulty. For example, relatively large amounts of sulphate, nitrate, acetate and chloride ion are tolerated without difficulty. Additionally, reducing substances may be tolerated as long as they do not reduce the dichromate ion concentration below the permissible limits. However, in the interest of operating economy, the presence of reducing substances such as arsine should be avoided.

The solutions used in my new coating process are characterized by their ability to be brushed, flowed or sprayed onto the surface, or the surface may be dipped into the solution and then removed, whereupon the coating is formed in a relatively short period of time. In addition, my solutions have the advantage of being able to perform their functions without the necessity of heating them, the optimum coating temperature lying between 60° F. and 80° F., although I have produced perfectly satisfactory coatings by using solutions lying anywhere within a temperature range of 40° F. to 100° F. Furthermore, the solutions are exceptionally well adapted for use in conventional dip or spray systems.

The solutions used in performing my improved coating process are characterized by content of fluoride ion, phosphate ion and dichromate ion in well defined proportions and having a pH within definite limits. Generally stated, the region of concentration and pH within which my solutions must be maintained for satisfactory coating is defined as follows:

(1) The phosphate ion content must be at least 1.5 grams per liter and not more than 300 grams per liter, and, preferably, between 50-55 grams per liter. As the phosphate ion concentration is reduced below the optimum range, the coatings produced by the solution become successively softer, lighter and more powdery. Below 1.5 grams per liter, the coating is covered with a non-uniform, greenish-white powder which may be easily removed to show a slightly etched metal surface. As the phosphate ion concentration is increased above the optimum range, the coatings become successively thinner, harder and more iridescent until at a concentration of above 300 grams per liter there is no visible coating on the metal surface.

(2) The dichromate ion expressed as $Cr_2O_7$ must be present at a concentration of at least 3.5 grams per liter and not more than 150 grams per liter and, preferably, between 12 and 18 grams per liter. Below 3.5 grams per liter, the coating becomes a very light powder which is easily brushed off the metallic surface showing a bright, slightly etched surface. As the concentration is increased over the optimum range, the coating becomes thinner, harder and more iridescent until, above 150 grams per liter there is no visible coating formed or visible attack on the metal.

(3) The fluoride ion content must be at least 0.75 gram per liter and not more than 95 grams per liter and, preferably, between 18-20 grams per liter. As the fluoride ion content is reduced below 18 grams per liter the coating becomes thinner, softer and iridescent. Below 0.75 gram per liter, there is no visible coating action on the surface of the metal. As the concentration exceeds 20 grams per liter, the coating becomes first thinner and iridescent and then increasingly softer and more powdery until at concentrations above 95 grams per liter no visible coatings are formed and the metallic surface is etched.

(4) Additionally, both the fluoride ion and the dichromate ion must be present in certain ratios. These ratios are $Cr_2O_7:F^-$ of between 1:0.375 and 5.45 and, preferably, between 1:1.34 and 1.40. As the fluoride decreases in respect to the dichromate from the optimum, the coating becomes thinner, harder and more iridescent until below the minimum permissible ratio, no visible coating action takes place on the metal. As the ratio increases over the optimum, the coatings become thinner, less uniform and softer; and over the maximum, the surface tends to become etched and covered with a thin coating of white powder.

(5) Finally, the pH of the coating solution must lie between 3.2 and 7.0 and, preferably, between 3.6 and 4.0. As the pH is decreased below 3.6, the coatings become less dense, softer and the metal increasingly heavily etched with the tendency below 3.2 to dissolve the already formed coating. As the pH increases over the optimum, the coatings become thinner, more iridescent, and over 7.0 the coatings become very loose and powdery.

While it is desirable to express the acidity of the operating solutions in terms of pH, unfortunately the pH cannot be determined satisfactorily in all instances by means of a glass electrode due to the attack of the fluoride ion upon the glass. Therefore, I have found it necessary to determine the pH of the solution colorimetrically and I make use of indicators that have a relatively high degree of resistance to the attack of the various ions and make my determinations as rapidly as possible.

In the foregoing description where optimum figures are given I wish to point out that for most purposes such optimum ranges are the most satisfactory. However, the broader ranges given are entirely usable and will produce excellent results. In fact, within the ranges given it is possible, if desired, to modify the character of the finished coating to suit individual requirements so that the resulting coating may be "tailor made," so to speak, for a specific job. For example, where a thin, tight, iridescent coating is wanted the ingredients should be adjusted as indicated for the purpose of securing such a coating, etc. Variations, therefore, are possible within the whole of the operative ranges specified.

In carrying out my improved process, the surface to be coated should be clean. The cleaning which forms no part of the present invention may be carried out by conventional methods. For example, grease and dirt may be removed by mild silicate alkali or by the use of an emulsion grease solvent. Any oxide films may be removed by acid or caustic soda treatment. The cleaned work, which may be wet or dry, is treated with a solution of proper composition of which one example is the following:

Formula #1

| | Grams |
|---|---|
| Ammonium dihydrogen phosphate, $NH_4(H_2PO_4)$ | 80 |
| Ammonium acid bifluoride, $NH_4F.HF$ | 30 |
| Potassium dichromate, $K_2Cr_2O_7$ | 20 |
| Water to make 1 liter | |

The pH of the solution produced by following Formula #1 is usually from 3.4 to 3.6 depending upon the acidity or alkalinity of the water used. This solution may be applied to a sheet of cleaned aluminum by means of a conventional paint brush and allowed to remain on the surface for three or four minutes. After this length of time, the excess coating solution is washed off with copious quantities of water, dried and painted. In regions where the water is extremely hard, it may be found desirable to acidulate this water with a little chromic acid before rinsing. By so doing, the tendency for any subsequently applied film of paint to blister is minimized. The chromic acid acidulated water can do no harm and, therefore, may be used as a matter of course whether the water be soft or hard. The coating solution described above may be applied at room temperature. If a faster coating action is desired, the solution may be heated and the time of contact between the coating solution and the aluminum surfaces thereby decreased. However, except during unusually cold weather, it is not necessary to apply external heat to the coating solutions in order to produce satisfactory coatings within a reasonable length of time.

Although, as previously stated, my coating solutions can be prepared from a variety of starting substances, possibly the simplest, cheapest, and most easily available combination of chemicals from which to prepare them is an alkali fluoride, phosphoric acid and chromic acid. The limits of composition within which the coating process is operative have been previously indicated.

Since the essential ingredients of my coating solution are fluoride ions, phosphate ions, and dichromate ions, it has been found desirable in making up the coating solutions, to use concentrated admixtures which need only be added to water or to acidified water to produce operative solutions of the proper composition. Such admixtures have the following advantages:
1. Only one chemical need be made up to be weighed or measured to make up the solution.
2. Shipping space and weight are saved by the omission of water from the admixtures.
3. Errors in calculating and measuring the proportions of the ingredients are minimized since the proportions are fixed by the composition of the concentrated admixture which can be prepared and checked once and for all.

The concentrated admixture must contain compounds of fluorine, phosphorus (as orthophosphate) and of hexavalent chromium, all in a form soluble in water and having a pH of 3.2 to 7.0 and, preferably, between 3.6 and 4.0. Such admixtures may or may not be compounded to include sufficient replaceable hydrogen to yield solutions of the proper pH range. The inclusion of replaceable hydrogen is desirable from the standpoint of ease in preparing the actual coating solutions since nothing but water and the concentrated admixture is then necessary to produce a coating solution with the proper chemical constituents and having the proper pH. However, should it be desirable to omit some of the replaceable hydrogen from the concentrated admixture, any mineral acid may be added to the solution in order to obtain the proper pH and the resulting solution will be operative.

Concentrated compositions may be made up as solutions, slurries, or solids. For ease in shipment and handling, solid admixtures are particularly desirable. To get usable coating solutions, these need only be added to water and, if the admixture is compounded without provision for free acid, the water should be acidulated to the proper degree.

A preferred embodiment of my invention as regards the concentrated admixture for use in preparing my improved coating solution, embodying only easily obtainable chemicals, is as follows:

*Formula #2*

| | Pounds |
|---|---|
| Ammonium dihydrogen phosphate, $NH_4H_2PO_4$ | 0.617 |
| Ammonium acid bifluoride, $NH_4F \cdot HF$ | 0.229 |
| Potassium dichromate, $K_2Cr_2O_7$ | 0.154 |
| | 1.000 |

These materials need only be mixed thoroughly and may be stored in wooden barrels or mild steel drums. When from 12 to 20 ounces of the materials of Formula #2 are dissolved in one gallon of water, an excellent coating solution having the proper pH is obtained. An advantage of this coating solution over most contemporary coating solutions is that it may be safely handled in mild steel equipment, thus eliminating the expense of using stainless steel or other highly acid resistent equipment. If the surface of the metal to be treated with the coating solution formed from the admixture of Formula #2 is not perfectly clean, or if more uniform coatings are desired, it may be found desirable to add a wetting agent. I have found that by the addition of small amounts of wetting agent, "streaking" of the work when it is removed from the coating solution is reduced to a minimum.

Coating solutions formed from the admixture of Formula #2 may be used in dip or spray processes, or may be painted or flowed onto the surface, or may be applied by any other method whereby the coating solution contacts the metallic surface for a short length of time.

I claim:
1. An aqueous solution for coating metal from the class consisting of aluminum and alloys thereof in which aluminum is the principal ingredient, the essential active coating-producing ingredients of which solution consisting of fluoride ion, dichromate ion and phosphate ion, the ions being present in amounts equivalent to

| | Grams per liter |
|---|---|
| Phosphate ion | 1.5 to 300 |
| Dichromate ion ($Cr_2O_7$) | 3.5 to 150 |
| Fluoride ion | 0.75 to 95 | the ratio of the dichromate ion to fluoride ion expressed as $Cr_2O_7:F^-$ being between 1:0.375 and 5.45 and the pH of the solution measured colorimetrically lying between 3.2 and 7.0.

2. An aqueous solution for coating metal from the class consisting of aluminum and alloys thereof in which aluminum is the principal ingredient, the essential active coating-producing ingredients of which solution consist of fluoride ion, dichromate ion and phosphate ion, the ions being present in amounts equivalent to

| | Grams per liter |
|---|---|
| Phosphate ion | 50 to 55 |
| Dichromate ion ($Cr_2O_7$) | 12 to 18 |
| Fluoride ion | 18 to 20 | the ratio of the dichromate ion to fluoride ion expressed as $Cr_2O_7:F^-$ being between 1:1.34 and 1.40 and the pH of the solution measured colorimetrically lying between 3.6 and 4.0

3. In a process for coating metal chosen from the group consisting of aluminum and alloys thereof in which aluminum is the principal ingredient with an adherent coating, the step which consists in subjecting the metal to the action of an aqueous solution the essential active coating-producing ingredients of which are fluoride ion, dichromate ion and phosphate ion, the ions being present in amounts equivalent to

| | Grams per liter |
|---|---|
| Phosphate ion | 1.5 to 300 |
| Dichromate ion ($Cr_2O_7$) | 3.5 to 150 |
| Fluoride ion | 0.75 to 95 | the ratio of the dichromate ion to fluoride ion expressed to $Cr_2O_7:F^-$ being between 1:0.375 and 5.45 and the pH of the solution measured colorimetrically lying between 3.2 and 7.0.

4. In a process for coating metal chosen from the group consisting of aluminum and alloys thereof in which aluminum is the principal ingredient with an adherent coating, the step which consists in subjecting the metal to the action of an aqueous solution the essential active coating-producing ingredients of which are fluoride ion, dichromate ion and phosphate ion, the ions being present in amounts equivalent to

| | Grams per liter |
|---|---|
| Phosphate ion | 50 to 55 |
| Dichromate ion ($Cr_2O_7$) | 12 to 18 |
| Fluoride ion | 18 to 20 | the ratio of the dichromate ion to fluoride ion expressed as $Cr_2O_7:F^-$ being between 1:1.34 and 1.40 and the pH of the solution measured colorimetrically lying between 3.6 and 4.0.

5. The process of claim 4 wherein the temperature of the solution lies between 40° F. and 100° F.

6. The process of claim 3 wherein the temperature of the solution lies between 40° F. and 100° F.

7. An admixture for use in the process of claim 3 in which the essential active coating-producing ingredients consist of compounds of fluorine yielding fluoride ions and compounds of phosphorus yielding $PO_4$ ions and compounds of chromium yielding dichromate ions all in a form soluble in water and in which for each part of hexavalent chromium, calculated as $Cr_2O_7$, there are from 0.375 to 5.45 parts fluorine and, additionally, in which, per liter of solution, the compounds of phosphorus will yield from 1.5 to 300 grams of phosphate ion and the compounds of chromium, expressed as $Cr_2O_7$, will yield from 3.5 to 150 grams of dichromate ion and the compounds of fluorine will yield from 0.75 gram to 95 grams of fluoride ion, and in which there is enough replaceable hydrogen to yield a pH of between 3.2 and 7.0

FRANK PALIN SPRUANCE, JR.

REFERENCES CITED

The following references are of record in the file of this patent:

UNITED STATES PATENTS

| Number | Name | Date |
|---|---|---|
| 2,042,611 | Lukens | June 2, 1936 |
| 2,203,670 | Buzzard | June 11, 1940 |
| 2,312,855 | Thompson | Mar. 2, 1943 |
| 2,438,877 | Spruance, Jr. | Mar. 30, 1948 |

FOREIGN PATENTS

| Number | Country | Date |
|---|---|---|
| 398,180 | Great Britain | Sept. 4, 1933 |
| 230,915 | Switzerland | May 1, 1944 |